(12) United States Patent
Banger (10) Patent No.: US 10,462,536 B2
(45) Date of Patent: Oct. 29, 2019

(54) SYSTEM FOR LOW-LATENCY DETECTION OF KNOWN AUDIO VIDEO CONTENT USING AUDIO FINGERPRINTING AND AUDIO WATERMARKING

(71) Applicant: M/S. Amagi Media Labs Pvt. Ltd, Bangalore (IN)

(72) Inventor: Shashidhar Banger, Bengaluru (IN)

(73) Assignee: M/s. Amagi Media Labs Pvt. Ltd, Bangalore (IN)

( * ) Notice: Subject to any disclaimer, the term of this patent is extended or adjusted under 35 U.S.C. 154(b) by 35 days.

(21) Appl. No.: 15/669,935

(22) Filed: Aug. 6, 2017

(65) Prior Publication Data

US 2018/0367868 A1 Dec. 20, 2018

(30) Foreign Application Priority Data

Jun. 16, 2017 (IN) .............................. 201741021221

(51) Int. Cl.
*H04N 21/8358* (2011.01)
*H04N 21/233* (2011.01)
(Continued)

(52) U.S. Cl.
CPC ..... *H04N 21/8358* (2013.01); *H04L 65/4076* (2013.01); *H04N 21/2335* (2013.01); *H04N 21/4398* (2013.01); *H04N 21/812* (2013.01); *G06Q 30/0254* (2013.01); *G10L 19/018* (2013.01); *H04L 65/80* (2013.01);
(Continued)

(58) Field of Classification Search
CPC ............. H04N 21/2668; H04N 21/458; H04N 21/8358
See application file for complete search history.

(56) References Cited

U.S. PATENT DOCUMENTS

2005/0015816 A1   1/2005   Christofalo
2006/0075449 A1   4/2006   Jagadeesan
(Continued)

FOREIGN PATENT DOCUMENTS

WO        2006097825 A2      9/2006

*Primary Examiner* — Omar S Parra
(74) *Attorney, Agent, or Firm* — Laurence P. Colton; Smith Tempel Blaha LLC (57) ABSTRACT

A system for low-latency detection of known audio-video content in multiple audio-video streams, received over a transport multiplex wherein multiple advertisements of different durations are being transmitted over a network. The system includes an ingest module, repositories of content assets, repositories of advertisement assets, a playout server, and network streams. A Watermarking and Fingerprinting (WMFP) module receives multiple advertisements A having audio-video streams, from a Master AV Database, placing an audio watermark on the incoming streams and extracting a high-confidence fingerprint (signature) from each of the watermarked assets A'. Communicating fingerprint signatures and replacement rules to one or more receivers over the Internet. One or more receivers at different locations actively replace detected advertisements having AV content, using a signature detector, with local content assets. The system provides a high confidence match without the disadvantage of an extended and expensive extraction time or false matches.

16 Claims, 5 Drawing Sheets

(51) Int. Cl.
*H04N 21/439* (2011.01)
*H04N 21/81* (2011.01)
*H04L 29/06* (2006.01)
*G06Q 30/02* (2012.01)
*G10L 19/018* (2013.01)
*H04N 21/2343* (2011.01)
*H04N 21/2389* (2011.01)
*H04N 21/4402* (2011.01)

(52) U.S. Cl.
CPC ... *H04N 21/2343* (2013.01); *H04N 21/23892* (2013.01); *H04N 21/4402* (2013.01)

(56) References Cited

U.S. PATENT DOCUMENTS

2009/0060265 A1* 3/2009 Rhoads ............... G06Q 20/341
382/100
2014/0201769 A1* 7/2014 Neumeier .......... H04N 5/44591
725/14
2018/0310058 A1* 10/2018 Gordon ............ H04N 21/44213

* cited by examiner

FIG. 6

SYSTEM FOR LOW-LATENCY DETECTION OF KNOWN AUDIO VIDEO CONTENT USING AUDIO FINGERPRINTING AND AUDIO WATERMARKING

STATEMENT OF RELATED APPLICATIONS

This patent application claims priority on and the benefit of Indian Patent Application No. 201741021221 having a filing date of 16 Jun. 2017.

BACKGROUND OF THE INVENTION

There are a number of applications, which require automatic detection of specific audio-video (AV) data (referred to as Master AV content) in a continuous video stream, including network broadcast streams or streams over the Internet. These streams typically have multiple AV streams and can be any of multiple streams, files, or archived content. For example, upon the automatic detection of specific AV clip in a received network broadcast stream, certain interesting actions can be performed. Examples of such actions would include changing the incoming AV content to some other local content, overlay some useful textual data on the broadcast stream, etc.

Technical Field

The present invention provides a system for reliable and robust detection of audio-video (AV) clips, using a combination of watermarking and fingerprinting, with improved accuracy at low latencies.

Prior Art

In order to identify the point of insertion within the network broadcast, the Internet or other content that is streamed, generically referred to as AV stream, present day systems provide an out-of-band identification marker that determines the point of insertion that guarantee seamless local content insertion. The marker may be a dual tone multi-frequency (DTMF) cue tone, an SCTE-35 message or an Adobe Flash ad insertion trigger. This marker is then sent over the network in an out-of-band manner synchronized with the point of insertion on the audio-video content. WO 2006097825 titled, System and Method for house hold-targeted advertising, discloses a system wherein, a Set Top Box has targeted ads delivered to it, and the system is specifically programmed for an IP stack. In this invention, advertisements are customized and delivered to a user by pulling on demand from a media storage device using SCTE-35 cues.

US2005015816 titled, System and method of providing triggered event commands via digital program insertion splicing, depict the extraction of a DVS 380 compliant message to determine the point at which local content is inserted. US2006075449 titled, Distributed architecture for digital program insertion in video streams delivered over packet networks, discloses a system in which, Internet Protocol (IP) splice points are inserted into a digital video transport stream by a head end unit. By the usage of splicing device downstream, this invention goes on to insert a specific ad at the splice points to customize the content based on demographic information.

These works of prior art imply a complex workflow when there are hundreds of advertising content planned to be inserted across different points of insertion. These solutions cannot work without modifications in broadcaster premises e.g. insertion of SCTE35, DTMF, etc., if not already supported. Additionally, there is a need for the marker to replace local content, in various incompatible formats through transmission systems. This renders present day systems unrealistic in the long run. There are systems in the market which use audio-video fingerprinting limited to local content insertion, such as DVEO's GEN2 ad insertion system. The problem with these systems is the ability to uniquely identify the content to be replaced when there can be multiple content assets with content remaining the same for a long duration.

BRIEF SUMMARY OF THE INVENTION

Local content insertion on network broadcast streams in Multiple System Operator (MSO) head ends, set-top boxes, extending to Internet content delivery networks, etc., is accomplished to target advertising to potential consumers, who are profiled based on demographics, besides many other variables. Advances in digital transmission technology enable novel methods for targeted advertising, where the advertisers can refine their strategies by catering to specific viewer demographics across geographies.

An ad for a product might have different durations with similar-sounding audio over some or the entire ad. For example, a 30-second ad, a 60-second ad and a 90-second ad for the same product are programmed at different frequencies, depending on a number of factors including a company's advertising budget, relevance to a demographic, etc.

For example, content can be relayed in different languages over different durations in different locations across the world, with parameters being altered depending on the time of the broadcast—prime-time vs. normal hours. In the course of transmission, over a network broadcast stream, more than one Master AV might need to be replaced with local content, depending on the advertiser's requirement. The present invention enables the detection of the exact portion of the broadcast stream (a state that this is only exemplary) where local content needs to be inserted by using a combination of fingerprinting and watermarking. Similar sounding audio over multiple durations is identified accurately with the present invention, within ads of varying length. While a combination of matching the AV stream over the longest duration, combined with fingerprinting would yield a high-confidence match, our invention enables a low-latency solution by using watermarking.

The present invention proposes a system and method for robust detection of one or more Master AV streams to be replaced. The present invention works even in cases where the Master AV streams have the same initial audio component over a certain duration. This invention utilizes a technique wherein the need for any intervention on the transmission source for identifying the point of insertion is eliminated. A combination of watermarking and fingerprinting is used to identify a stream of Master AV. Our solution provides a high confidence match without the disadvantage of an extended and expensive extraction time or false matches. The detection mechanism of the present invention is very lightweight, consisting of just using the audio fingerprint matching technique to uniquely identify the presence of a master AV content. Additionally, this technique can be used to build a system with minimal intrusion into existing systems. For example, in local content inserting application, the broadcaster workflow does not change at all.

The broadcaster only has to use the watermarked AV content in its work-flow instead of using the original master AV content.

A system for low-latency detection of known audio-video content in multiple audio-video streams, received over a transport multiplex wherein multiple advertisements of different durations are being transmitted over a network, having (a) an ingest module (b) one or more repositories of content assets, (c) one or more repositories of advertisement assets, (d) a playout server, (e) one or more repositories of advertisement assets, and (e) one or more network streams. Further, a Watermarking and Fingerprinting (WMFP) module, which receives multiple advertisements having audio-video streams, from a Master AV Database, placing an audio watermark on the incoming streams and extracting a high-confidence fingerprint (signature) from each of the watermarked assets. Communicating fingerprint signatures and replacement rules to one or more receivers over the Internet, one or more repositories of a local content asset, and one or more receivers at different locations, actively replacing detected advertisements having AV content, using a signature detector, with local content assets, based on the replacement rules. The WMFP module places an audio watermark on the Master AV stream, the audio watermark being a pseudo-random, in audible noise sequence. The advertisement assets from the Master AV Database can have similar audio portions over a certain duration of their content. The WMFP module extracts a fingerprint (signature) from the watermarked content, the fingerprint being unique across assets with similar audio patterns toward the beginning due to the pseudo-random watermark, thereby disambiguating assets with similar sounding audio over an initial match duration at the receiver. The replacement rules specify an identifier for the Master AV stream, the corresponding fingerprint signature and the replacement schedule on specific local receivers. The repositories of local content assets comprise content assets that are specific to certain demographics, geographies, and customers.

In the present invention, the receivers have low complexity signature detectors. The detector receiving a broadcast AV stream for which it keeps generating the fingerprint for a window of audio, which has a fixed match duration. Matching the generated signature against all the references stored in the signature DB. Representing the signatures as a sequence of a bit, a bit string. Detecting a match when the generated signature and a reference signature have the number of bits matching above a predefined threshold. Disambiguating two or more similar sounding master AVs having a match more than by considering the master AV stream having the maximum matched bits compared to the current audio snapshot signature as the right master AV stream match. The receivers have signature detectors further comprising, performing watermark verification by extracting residual noise audio from incoming audio, co-relating the extracted noise against the being a pseudo-random, inaudible noise sequence generated by the WMFP module; and detecting a match when the Master AV and the watermarked output match. The receivers at different locations monitor the transmitted content, actively replacing detected advertisements (A') using the signature detector, with local content assets, based on the replacement rules.

A computer-implemented method for low-latency detection of known audio-video content in multiple audio-video streams, received over a transport multiplex wherein multiple advertisements of different durations are being transmitted over a network, having (a) an ingest module (b) one or more repositories of content assets, (c) one or more repositories of advertisement assets, (d) a playout server, (e) one or more repositories of advertisement assets, and (e) one or more network streams. Watermarking and Fingerprinting multiple advertisements A having audio-video streams, from a Master AV Database, placing an audio watermark on the incoming streams and extracting a high-confidence fingerprint (signature) from each of the watermarked assets A'. Communicating fingerprint signatures and replacement rules to one or more receivers over the Internet. Accessing one or more repositories of local content assets. Receiving via one or more receivers at different locations, the broadcast content including watermarked assets. Detecting advertisements having AV content, to be replaced, by matching their fingerprint signatures over a match duration using a signature detector. Replacing detected advertisements, with local content assets, based on the replacement rules, at the receiver. The step of Watermarking and Fingerprinting further comprises placing an audio watermark on the Master AV stream, the audio watermark being a pseudo-random, in audible noise sequence. The advertisement assets from the Master AV Database can have similar audio portions over a certain duration of their content. The step of Watermarking and Fingerprinting further comprises extracting a fingerprint (signature) from the watermarked content, the fingerprint being unique across assets with similar audio patterns toward the beginning due to the pseudo-random watermark thereby disambiguating assets with similar sounding audio over an initial match duration at the receiver. The receivers have low complexity signature detectors further implementing the steps of, receiving a broadcast AV stream for which it keeps generating the fingerprint for a window of audio, which has a fixed match duration, matching the generated signature against all the references stored in the signature DB, representing the signatures as a sequence of bit, a bit string, detecting a match when the generated signature and a reference signature have the number of bits matching above a predefined threshold, and disambiguating two or more similar sounding master AVs having a match more than by considering the master AV stream having the maximum matched bits compared to the current audio snapshot signature as the right master AV stream match.

The receivers have signature detectors further implementing the steps of, performing watermark verification by extracting residual noise audio from incoming audio, co-relating the extracted noise against the being a pseudo-random, inaudible noise sequence generated by the WMFP module, and detecting a match when the Master AV and the watermarked output match. The receivers at different locations monitor the transmitted content, actively replacing detected advertisements using the signature detector, with local content assets, based on the replacement rules. The replacement rules specify an identifier for the Master AV stream, the corresponding fingerprint signature and the replacement schedule on specific local receivers. The repositories of local content assets comprise content assets that are specific to certain demographics, geographies, and customers.

DETAILED DESCRIPTION OF THE PREFEFERED EMBODIMENTS

Figure 1:
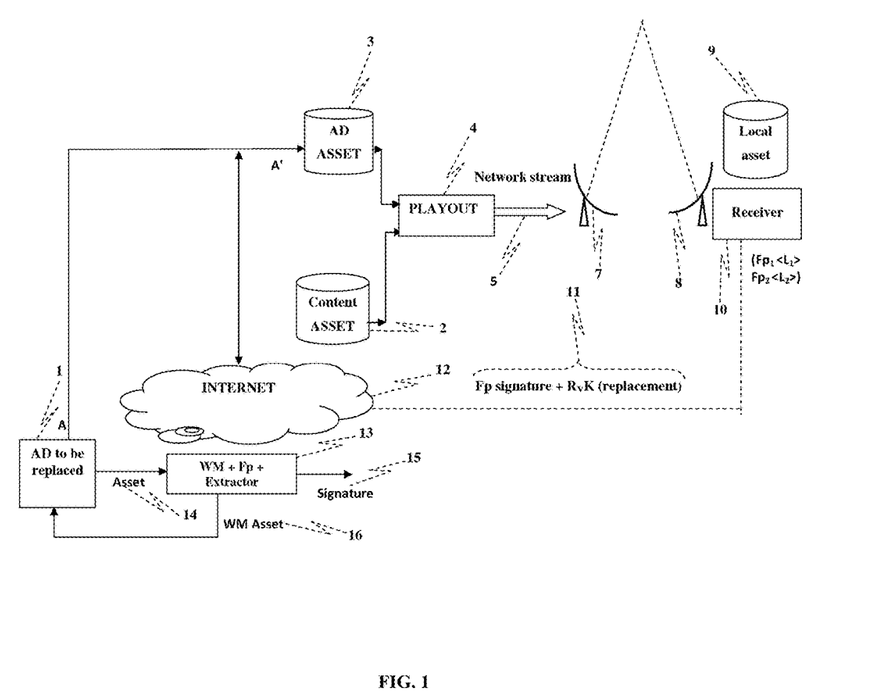
FIG. 1 illustrates the overall system of the present invention.

FIG. 1 illustrates the overall system of the present invention. A required audio-video content that has to be transmitted in the multiple audio-video streams is multiplexed with the advertisements of different durations. For seamless detection and replacement of the audio-video content, a system with different modules are created which comprises of the following (a) an input module for the advertisement (AD) to be placed 1, (c) one or more repositories of content assets 2, (d) one or more repositories of advertisement (AD) assets 3, (e) a playout server 4, (f) one or more network streams 5, (g) one or more repositories of local assets 9, and (h) a receiver 10. From the input module, the assets that refer to the multiple advertisements A having the audio-video streams 14 from a Master AV is sent to a Watermarking and Fingerprinting (WMFP) extractor 13 which add Watermark and then extracts the Fingerprint. In this WMFP extractor 13, an audio watermark which is a psychoacoustically shaped pseudo-random inaudible noise sequence is mixed into the input audio streams, and a high-confidence fingerprint (signature) 15 is extracted from each of the watermarked assets A' 16. Once the watermarked assets are generated, the system communicates the obtained fingerprint signatures 15 and a set of replacement rules to one or more receivers, over the Internet 12. Then the watermarked assets A' 16 are transmitted to the input module for the advertisement (AD) to be placed 1 which in turn pushes to the advertisement (AD) assets 3 module for adding the advertisement which is to be picked up by a network stream provider. The network stream provider subsequently picks these assets to be played out on the playout server 6 as per the broadcast schedule. The modified watermarked assets are combined with the content assets 2, and then the output is sent as network streams 6 via satellite uplink 7. At the receiving end, there are multiple repositories of local content assets 9 for storing content that is specific to certain demographics, geographies, and customers. The receivers 10 at different locations actively replace detected advertisements that are obtained from satellite downlink 8 using the fingerprint signatures, with local content assets 2 based on the replacement rules 11. The replacement rules are received via the Internet 12.

Figure 2:
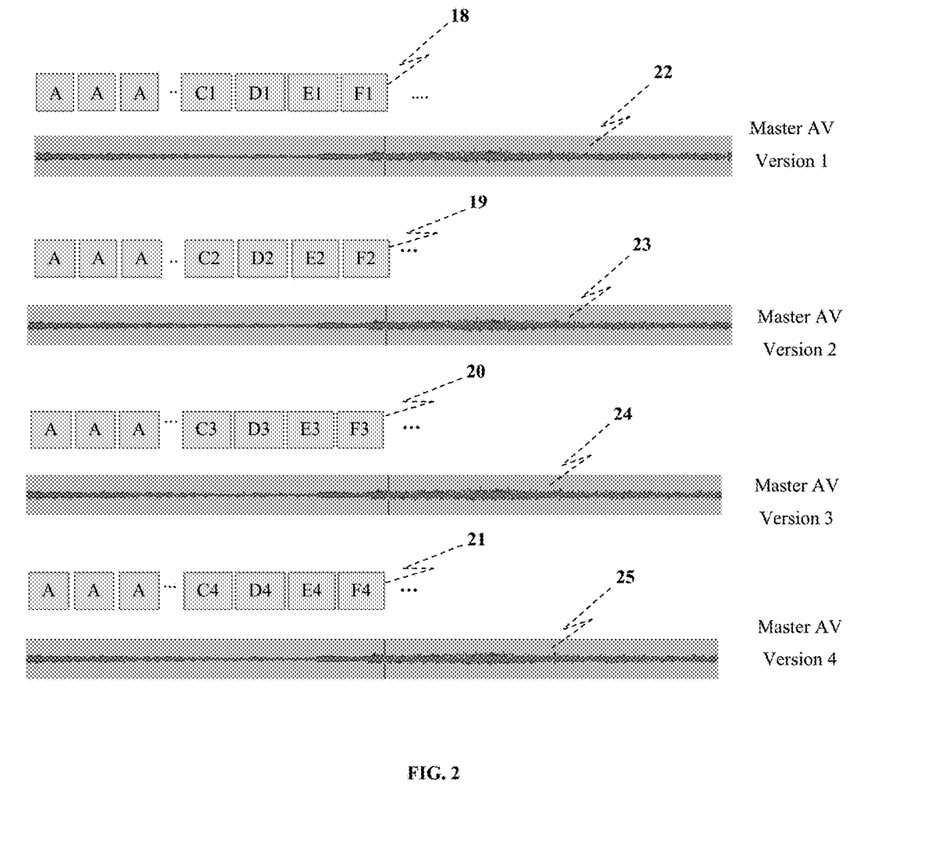
FIG. 2 illustrates different audio-video master content, having the same audio-video at the beginning and different video, making them different versions.

FIG. 2 illustrates the different audio-video Master content, having the same audio-video in the beginning 18, 19, 20, 21 and different video, making them different versions 22, 23, 24, 25. Detection of the correct AV content at the receiver will fail in scenarios, where there are multiple versions of the Master AV, which are having the same audio-video for the first match duration seconds. Resulting in more than one Master AV stream (or content) matching the live content when one of them is aired. Moreover, the match value i.e. the number of bits matching will all be greater than a threshold T value. In such scenarios, there is no other additional information to decide exactly which Master AV stream has been received in the broadcast stream.

Figure 3:
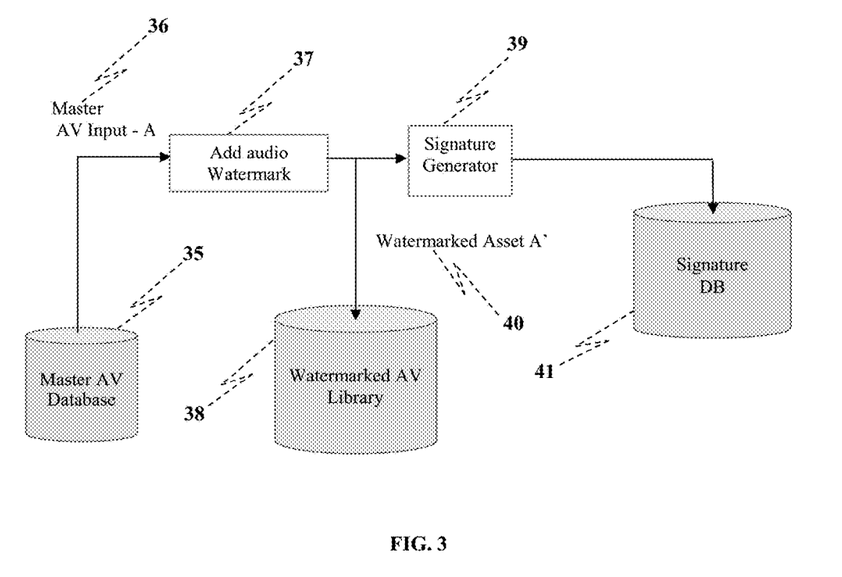
FIG. 3 illustrates a system wherein, the WMFP module takes the Master audio-video input, watermarks it and generates the corresponding audio signature and stored in a signature database (DB), sending the watermarked assets as outputs.

FIG. 3 illustrates the system wherein, the WMFP module takes the Master audio-video input 36, watermarks it, and generates the corresponding audio signature. The generated signature has been stored in a signature database (DB) 41. The WMFP module sends the watermarked assets A' 40 as an output. The original Master AV streams A 36 from the Master AV database 35 are passed through the watermarking scheme 37. The audio watermarking changes each of the Master AV streams 36 uniquely without any perceivable change in the original audio. The Watermarked AV streams A' 40 are then stored in the Watermarked AV Library 38 that are shared with the broadcaster, to be played out on the playout server 5. This will result in the watermarked assets A' to be present in the broadcast streams received by the receiver 10. The signature generator 39 extracts the unique fingerprint signature for each of the watermarked AV streams and stores them in the signature database 41, which are then pushed to the signature detectors 53, 54, 55 through a transport server 52, which is present on the internet 12.

Figure 4:
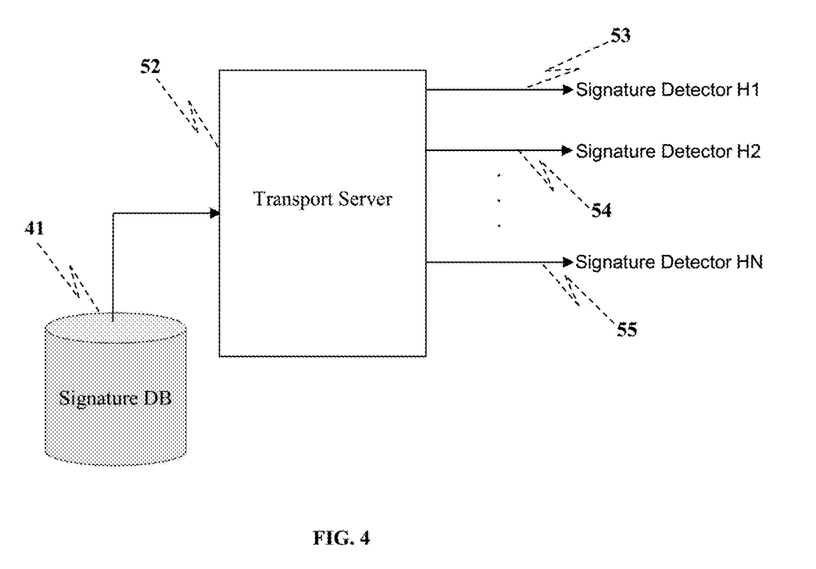
FIG. 4 illustrates a system in which, a Transport server ensures that the signature DB for all master AVs is replicated in the signature detectors at various receivers spread across different regions.

FIG. 4 illustrates a system in which, the transport server 52 ensures that the Signature Database (DB) 40 for all Master AVs is replicated in the signature detectors 53, 54, 55 at various receivers, spread across different regions.

Figure 5:
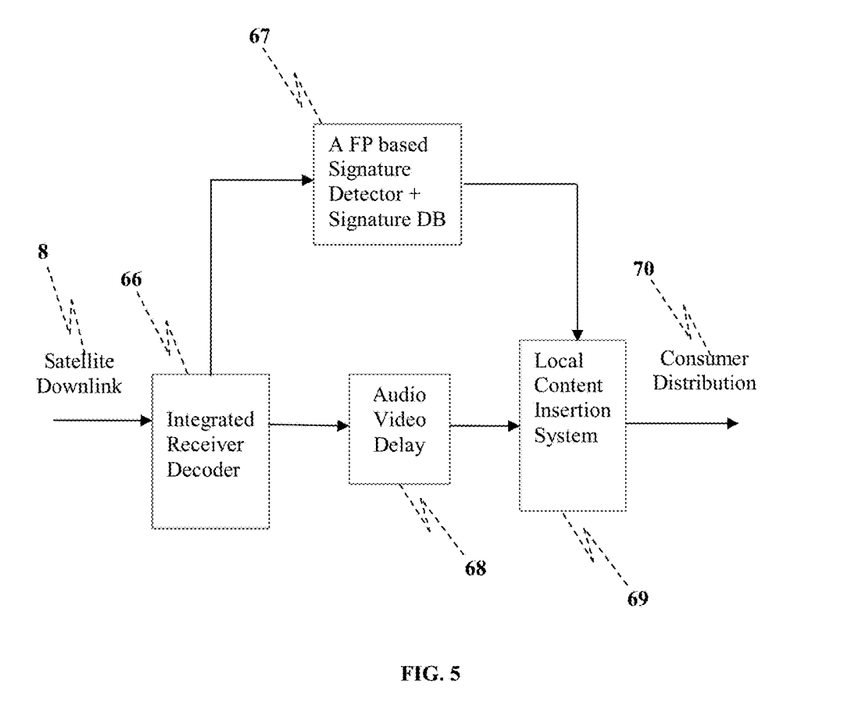
FIG. 5 illustrates a receiver having a signature detector to detect a master AV content.

FIG. 5 illustrates a receiver with a signature detector to detect the Master AV content. The detection can be achieved by the replacement rules, which specifies an identifier for the Master AV stream, the corresponding fingerprint signature, and the replacement schedule on particular local receivers. From the satellite downlink 8, the integrated receiver decoder 66 collects the network stream 6, which consists of the modified watermarked assets combined with the content assets 4. The fingerprint (FP) based Signature Detector, and Signature DB module 67 reads all the signatures present in the modified watermarked assets and stores them in its memory. It also receives the broadcast AV stream for which it keeps generating the fingerprint for a window of the audio, which has a fixed match duration (for example, 1.2 seconds) length. The generated signature is matched against all the references stored in the signature DB 41. The signatures can be represented as a sequence of bits or a bit string. The generated signature and a reference signature said to be matching, if the number of bits matching is above a predefined threshold T. Two or more similar sounding Master AVs could have a match more than the predefined threshold T. In such cases, the Master AV stream is considered to have the maximum matched bits, compared to the current audio snapshot signature as the right Master AV stream match. After the Master AV, a stream is detected by the signature detector 67, it signals the local content insertion system 69, which plays back the locally stored AV stream (or content). Thus, replacing the Master AV stream with a local AV stream and delivered to the consumer distribution 70.

Watermarking is being used in the following ways by the system that provides an additional mechanism that leads to detect uniquely:

1. A watermark assists to delineate between similar audios. For example, if A1, A2 are two different masters having same audio in the beginning then the watermarked outputs A1' and A2' will be uniquely detected just by doing fingerprint match. This allows us to uniquely perceive watermarked content using very minimal computation of fingerprint matching alone which in turn allows the detection method to run on low end embedded platforms.

2. The next problem that watermarking has been used to solve is to detect original versus watermarked content. For example, we do not want to detect the original as a replacement candidate in geo targeting application. Suppose there is a master AD, say C, a watermarked output C' is generated and the signature is stored in reference DB. Now, the broadcaster is airing both C and C'. The system is supposed to replace on C' only and let C pass through.

There are two approaches to solve this problem:
1. Using Fingerprint alone: We keep the signature of the original audio also in the signature database. When C is airs the fingerprint of C will match more strongly to the reference signature corresponding to C and vice versa. This helps in solving the problem of uniquely detecting C and C' using very low computation.
2. The other way is to do watermark verification. The residual noise audio is extracted from incoming audio, and this is then correlated against the pseudo-random noise generated using the seed in the signature of C'. The correlation will be strong only when C' is aired and non-existent when C is aired, thus avoids allowing us to uniquely identify C and C'.

The usage of the above mechanisms can vary with computation capabilities and application needs.

An audio-video delay 68 module is introduced to achieve a frame accurate splicing of the local content over the Master AV stream. The delay element delays the AV input to the output by an amount which is sufficient to match reference signatures to incoming audio and to prepare a local content to be replaced frame accurately. In the absence of a delay element, a part of the Master AV stream is transmitted, by the time the signature detector 67 identifies the Master AV stream, thereby resulting in an imperfect splicing. The delay is typically of the order of 1-2 seconds. In other applications, for example providing context-based Meta information feeds to consumers on Master AV stream detection, where this delay element is not required.

Figure 6:
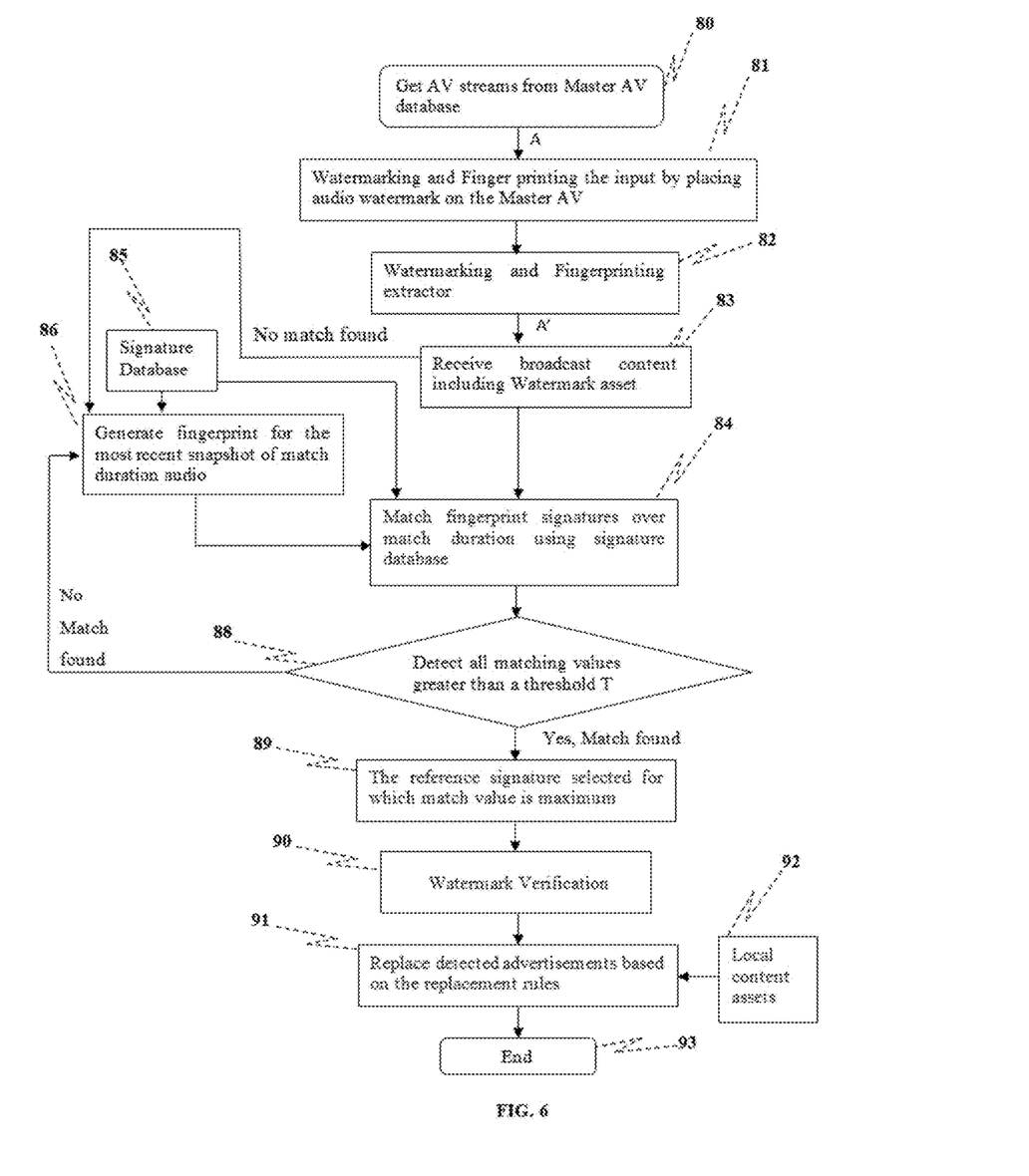
FIG. 6 illustrates the overall process within the present invention.

FIG. 6 illustrates the overall process of the present invention. In this process, the multiple advertisements A, having audio-video streams obtained from the Master AV Database 80 for watermarking and fingerprinting. The watermarking has been done by placing the audio watermark on the Master AV 81. After the placement of the audio watermark, the Watermarking and Fingerprinting extractor 82 generates a high-confidence fingerprint (signature) from each of the watermarked assets A'. That is, it will generate a fingerprint for the most recent snapshot of match duration audio 86 using the signature Database 85. The generated fingerprint signatures and replacement rules are communicated to receivers over the Internet. The broadcast content including watermarked asset A' from the extractor is received via one or more receivers at different locations 83. At the receiving end, the generated fingerprint is matched against all the stored reference fingerprints read from the signature database 84. The matching value which is the number of bits matching between the generated and a reference fingerprints are computed for all the reference signatures. Fingerprints are a sequence of bits or bit string so the matching values can be easily computed. Then all the matching values that are greater than a threshold T detected 88. If one or more matching values are filtered, it will proceed to the next step. Otherwise, the receiver continues generating the fingerprint for new incoming audio data to regenerate the fingerprint signatures. After finding the matching value, the reference signature is selected for which match value is maximum 89. After this, the embedded watermark residual audio is extracted from the current snapshot audio which is correlated against the pseudo-random noise which was added to the matched reference during the original watermarking process. The pseudo-random noise can be generated at the receiver as the seed is stored in the signature files. Replacement of the right content is certain only after the watermark detector provides high correlation with the detected reference signature.

Then the watermark is verified to ensure correct detection 90. The residual noise audio from incoming audio is extracted and attempt to correlate this against the pseudo-random noise generated using the seed in the signature. This correlation will be strong only when watermarked output is aired and non-existent when Master AV is aired, this allows us to avoid false positive problems. The detected advertisements are replaced 91 with local content assets 92, based on the replacement rules at the receiver. The process will come to an end 93 when it is delivered to the Consumer.

What is claimed is:
1. A system for low-latency detection of known audio-video content in multiple audio-video streams, received over a transport multiplex wherein multiple advertisements of different durations are being transmitted over a network, having (a) an ingest module, (b) at least one repository of content assets, (c) at least one repository of advertisement assets, (d) a playout server, (e) at least one repository of advertisement assets, and (f) at least one network streams, comprising:
   a) a Watermarking and Fingerprinting (WMFP) module, which receives multiple advertisements A having audio-video streams, from a Master AV Database, placing an audio watermark on the incoming streams and extracting a high-confidence fingerprint (signature) from each of the watermarked assets A';
   b) communicating fingerprint signatures and replacement rules to at least one receiver over the Internet;
   c) at least one repository of local content assets; and
   d) at least one receiver at different locations, actively replacing detected advertisements having AV content, using a signature detector, with local content assets, based on the replacement rules,
   wherein the at least one receiver has low complexity signature detectors further comprising:
   a) the detector receiving a broadcast AV stream for which it keeps generating the fingerprint for a window of audio, which has a fixed match duration;
   b) matching the generated signature against all the references stored in the signature DB;
   c) representing the signatures as a sequence of bit, a bit string;
   d) detecting a match when the generated signature and a reference signature have the number of bits matching above a predefined threshold T; and
   e) disambiguating at least two similar sounding master AVs having a match more than T by considering the master AV stream having the maximum matched bits compared to the current audio snapshot signature as the right master AV stream match.

2. The system for low-latency detection of known audio-video content in multiple audio-video streams of claim 1, wherein the WMFP module places an audio watermark on the Master AV stream, the audio watermark being a pseudo-random, inaudible noise sequence.

3. The system for low-latency detection of known audio-video content in multiple audio-video streams of claim 1, wherein the advertisement assets from the Master AV Database has similar audio portions over a certain duration of their content.

4. The system for low-latency detection of known audio-video content in multiple audio-video streams of claim 1, wherein the WMFP module extracts a fingerprint signature from the watermarked content, the fingerprint being unique across assets with similar audio patterns toward the beginning due to the pseudo-random watermark, thereby disambiguating assets with similar sounding audio over an initial match duration at the receiver.

5. The system for low-latency detection of known audio-video content in multiple audio-video streams of claim 1, wherein the replacement rules specify an identifier for the Master AV stream, the corresponding fingerprint signature and the replacement schedule on specific local receivers.

6. The system for low-latency detection of known audio-video content in multiple audio-video streams of claim 1, wherein the at least one repository of local content assets comprise content assets that are specific to certain demographics, geographies, and customers.

7. The system for low-latency detection of known audio-video content in multiple audio-video streams of claim 1, wherein the at least one receiver has signature detectors further comprising:
 a) performing watermark verification by extracting residual noise audio from incoming audio;
 b) correlating the extracted noise against the pseudo-random, inaudible noise sequence generated by the WMFP module; and
 c) detecting a match when the Master AV and the watermarked output match.

8. The system for low-latency detection of known audio-video content in multiple audio-video streams of claim 1, wherein the receivers at different locations monitor the transmitted content, actively replacing detected advertisements (A') using the signature detector, with local content assets, based on the replacement rules.

9. A computer-implemented method for low-latency detection of known audio-video content in multiple audio-video streams, received over a transport multiplex wherein multiple advertisements of different durations are being transmitted over a network, having (a) an ingest module, (b) at least one repository of content assets, (c) at least one repository of advertisement assets, (d) a playout server, (e) at least one repository of advertisement assets, and (f) at least one network streams, comprising the steps of:
 a) Watermarking and Fingerprinting multiple advertisements A having audio-video streams, from a Master AV Database, placing an audio watermark on the incoming streams and extracting a high-confidence fingerprint (signature) from each of the watermarked assets A';
 b) communicating fingerprint signatures and replacement rules to at least one receiver over the Internet;
 c) accessing at least one repository of local content assets;
 d) receiving via at least one receiver at different locations, broadcast content including watermarked assets;
 e) detecting advertisements having AV content, to be replaced, by matching their fingerprint signatures over a match duration using a signature detector; and
 f) replacing detected advertisements, with local content assets, based on the replacement rules, at the at least one receiver,
 wherein the at least one receiver has low complexity signature detectors further implementing the steps of:
  a) receiving a broadcast AV stream for which it keeps generating the fingerprint for a window of audio, which has a fixed match duration;
  b) matching the generated signature against all the references stored in the signature DB;
  c) representing the signatures as a sequence of bit, a bit string;
  d) detecting a match when the generated signature and a reference signature have the number of bits matching above a predefined threshold T; and
  e) disambiguating at least two similar sounding master AVs having a match more than T by considering the master AV stream having the maximum matched bits compared to the current audio snapshot signature as the right master AV stream match.

10. The computer-implemented method for low-latency detection of known audio-video content in multiple audio-video streams of claim 9, wherein the step of Watermarking and Fingerprinting further comprises placing an audio watermark on the Master AV stream, the audio watermark being a pseudo-random, inaudible noise sequence.

11. The computer-implemented method for low-latency detection of known audio-video content in multiple audio-video streams of claim 9, wherein the advertisement assets from the Master AV Database have similar audio portions over a certain duration of their content.

12. The computer-implemented method for low-latency detection of known audio-video content in multiple audio-video streams of claim 9, wherein the step of Watermarking and Fingerprinting further comprises extracting a fingerprint signature from the watermarked content, the fingerprint being unique across assets with similar audio patterns toward the beginning due to the pseudo-random watermark thereby disambiguating assets with similar sounding audio over an initial match duration at the receiver.

13. The computer-implemented method for low-latency detection of known audio-video content in multiple audio-video streams of claim 9, wherein the at least one receiver has signature detectors further implementing the steps of:
 a) performing watermark verification by extracting residual noise audio from incoming audio;
 b) correlating the extracted noise against the pseudo-random, inaudible noise sequence generated by the WMFP module; and
 c) detecting a match when the Master AV and the watermarked output match.

14. The computer-implemented method for low-latency detection of known audio-video content in multiple audio-video streams of claim 9, wherein the receivers at different locations monitor the transmitted content, actively replacing detected advertisements (A') using the signature detector, with local content assets, based on the replacement rules.

15. The computer-implemented method for low-latency detection of known audio-video content in multiple audio-video streams of claim 9, wherein the replacement rules specify an identifier for the Master AV stream, the corresponding fingerprint signature and the replacement schedule on specific local receivers.

16. The computer-implemented method for low-latency detection of known audio-video content in multiple audio-video streams of claim 9, wherein the at least one repository of local content assets comprise content assets that are specific to certain demographics, geographies, and customers.

* * * * *